June 11, 1929.　　　　L. E. WILSON　　　　1,716,611
TRUCK
Filed May 16, 1923　　　2 Sheets-Sheet 1

Inventor
Louis E. Wilson

June 11, 1929.     L. E. WILSON     1,716,611
TRUCK
Filed May 16, 1923     2 Sheets-Sheet 2

Inventor
Louis E. Wilson,
By Stewart & McKay
his Attorneys

Patented June 11, 1929.

1,716,611

UNITED STATES PATENT OFFICE.

LOUIS E. WILSON, OF ROCHESTER, MINNESOTA.

TRUCK.

Application filed May 16, 1923. Serial No. 639,415.

This invention relates generally to trucks; and relates more particularly to trucks adapted to be pushed or drawn by hand.

In the class of trucks known as "hand-trucks" there are two types which have been in general use for a long time. One of these types is the tilting two-wheel truck sometimes called a "warehouse truck" and the other is the push truck with four wheels, two of which are castor wheels. Each of these types has advantages, but is limited in use. The tilting two-wheel type of truck is particularly adapted to carry heavy bulky articles such as heavy boxes, barrels and bags, but is not adapted to carry small packages while the four-wheel push truck is well adapted to carry small packages, but is not very satisfactory when used to carry heavy articles, especially those of large bulk.

One of the objects of this invention is to provide a truck which combines in one truck all the advantages and essential features of several types of trucks.

Another object of this invention is to provide a truck which can be readily converted from one type of truck to another.

A further object of the invention is to provide a truck which may be used as a two-wheeled tilting truck or as a four-wheeled push truck.

With the foregoing general objects in view, as well as some others that will be obvious as the description proceeds, the invention comprises the features, details of construction and combinations of parts which will first be described in connection with an illustrative embodiment of the broad principles of the invention in an especially desirable specific construction, and will then be more particularly pointed out in the appended claims.

The accompanying drawings forming a part hereof show particularly advantageous practical forms which the broad invention may take. In these drawings, Fig. 1 is a top plan view of a truck embodying the invention with the detachable bed or platform removed.

Fig. 5 is a perspective view showing a modified body structure, and

Figs. 6 and 7 are fragmentary perspective views showing a modification in the means of attaching the bed or platform to the truck.

Figure 1:
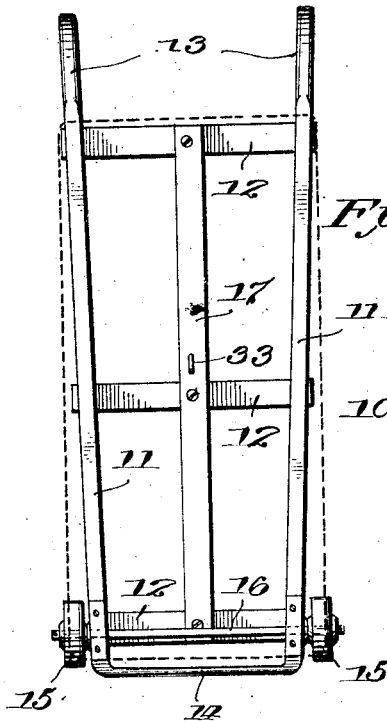

Generally stated, the new and improved truck comprises a frame provided at one end with an axle and supporting wheels and at the other end with grip handles and castor wheels, and a platform, provided with combined package supports and handle bars, detachably secured to said frame whereby the truck may be used as a two-wheeled tilting truck or as a four-wheeled push truck.

Referring to the drawings, 10 indicates generally the truck frame comprising longitudinal side pieces 11 and cross-pieces 12 secured or joined to the side pieces 11 by any suitable means. Adjacent ends of the side pieces 11 are provided with grip handles 13, the ends of the side pieces opposite the handles being connected by a toe plate or tip 14. The end of the frame which carries the toe plate is supported by wheels 15 mounted on an axle 16 carried by the side pieces 12. Cross pieces 12 are connected and braced by a longitudinal brace piece or member 17 secured to the cross pieces by screws or other suitable means. The parts above described make up a truck of the tilting two-wheel type, sometimes known as a "warehouse truck". As explained before this type of truck is well suited to carry heavy bags, boxes and barrels, but is not suited to carry small or light packages, partly because small packages will fall through the open frame and partly because the packages cannot be stacked on the truck without falling off when the truck is propelled, especially since this type of truck is tipped when it is pushed or pulled about.

Figure 2:
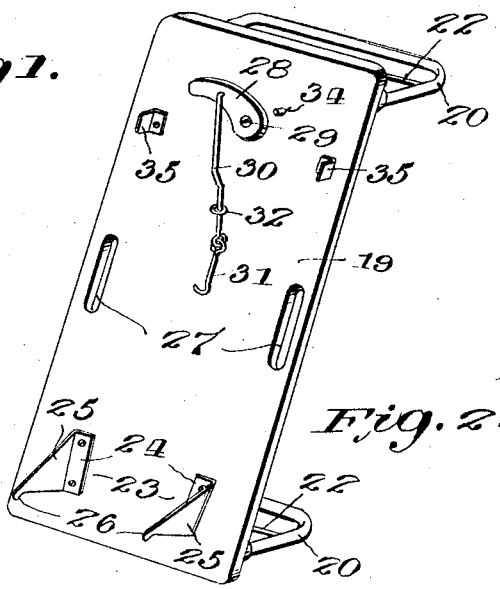
Fig. 2 is a perspective view of the bed or platform standing on end, showing principally the underside of the bed or platform.
Figure 3:
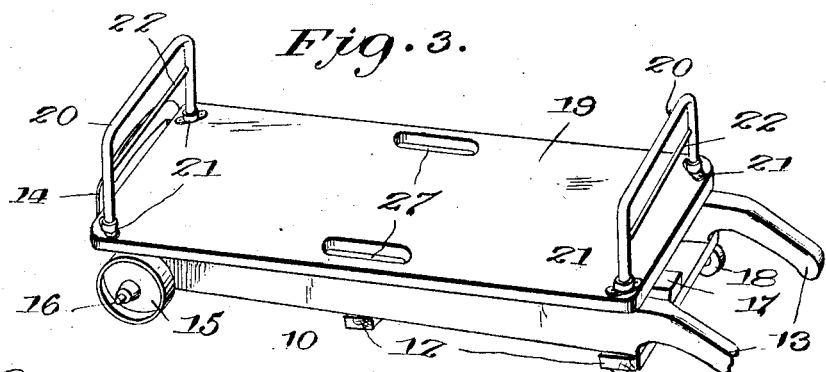
Fig. 3 is a perspective view of the truck with the bed or platform attached.
Figure 4:
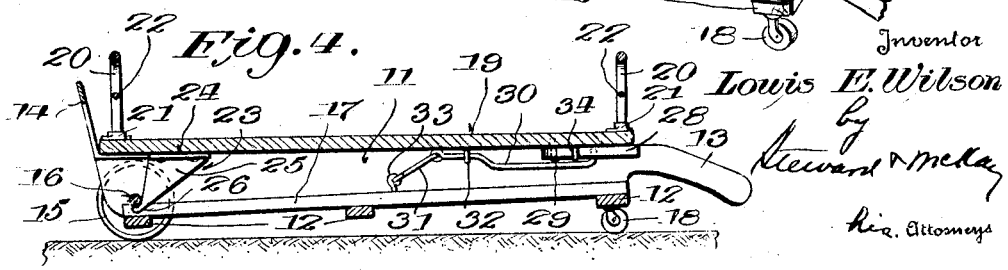
Fig. 4 is a longitudinal sectional view.

In order to make tipping of the truck to propel it unnecessary, the truck frame is provided with castors 18 mounted at the handle end of the frame to permit the truck to be used as a four-wheel truck, the castors allowing the truck to be steered or guided in any direction. The wheels 15 and castors 18 support the truck frame in a substantially horizontal position. In order to permit packages to be stacked or piled on the truck without danger of accidentally falling off and also to afford a solid support for the same, a bed or platform 19 is provided, said bed or platform adapted to be detachably secured to the truck frame. Referring to Figs. 2, 3 and 4, the bed or platform 19 comprises in the present example a solid plane-surfaced rectangular member which may be made of any suitable material, such as wood, steel, etc. When made of wood, the bed or platform can be made in one piece or it can be made of strips of wood glued together and reinforced by clamping rods which also hold the strips together. As shown in Fig. 3, when attached to the truck frame 10, the bed or platform 19 rests on the longitudinal side pieces 11 covering the entire frame except, of course, the handles 13. Each end of the platform or bed 19 is provided with a combined package support and handle bar 20. This may be of any suitable construction, although the construction shown is preferable because of its simplicity and cheapness. In the example illustrated, each combined support and handle bar 20 comprises a section of pipe bent in the shape of a U, with the ends of the U threaded into bases or supports 21, secured by screws or other suitable fastening means to the bed or platform. One or more cross rods 22 connect the arms of each of the U-shaped end members 20 to brace the arms and to prevent small packages from slipping through the end members. When used as a four wheel truck, the end members 20 not only act as end guards to support packages which are stacked thereagainst, but also as convenient means to be grasped by the hands when propelling the truck.

Means for easily and quickly attaching and detaching the bed or platform to or from the truck are provided. The bed or platform 19 is secured to the truck frame 10 by thrusting the bed or platform toward one end of the truck, means being provided to prevent disengagement of such securing means. Referring to Figs. 2 and 4, the underside of the bed or platform 19 is provided at one end with abutment brackets or stops indicated generally by 23. In the example illustrated, two such brackets are shown in alignment transversely of the bed or platform. Each bracket is substantially L shaped, with one arm 24, forming a base portion, secured to the platform or bed 19 by screws, rivets, bolts or other suitable fastening means. The other arm 25 of each bracket depends or projects from the bed or platform, forming an abutment or stop, the projecting end being provided with a hook portion 26. When the bed or platform 19 is in position to be secured to the truck frame 10, the arms 25 of brackets 23 depend or project from the underside of the bed or platform. When it is desired to attach the bed or platform 19 to the truck frame 10, the end of the platform or bed carrying the abutment brackets is pushed or thrust toward the end of the truck frame carrying the axle and supporting wheels until the abutment brackets engage the axle 16. In this position arms 25 of the brackets will prevent further longitudinal movement of the bed or platform in the direction of thrust and hook-portions 26 will hook under the axle 16 to prevent movement of the bed or platform up or away from the truck frame. (See Fig. 4). The bed or platform 19 is provided with hand-holds 27 to provide convenient means for grasping and holding the bed or platform in the attaching or detaching operation.

Means are also provided for preventing accidental disengagement of the securing means provided at one end of the truck and for securing the other end of the bed or platform to the truck. Referring to Figs. 2 and 4, 28 indicates a lever pivoted at 29 to the underside of the bed or platform 19, near one end of the latter. One end of a link 30 is pivotally connected to the swinging end of lever 28, the other end of the link being connected by a loose connection to a hook 31. Link 30 passes through a supporting eye or guide 32, attached to the bed or platform, the supporting eye or guide permitting sliding and swinging movement of link 30. Hook 31 is adapted to engage means carried by the truck frame to thereby secure the platform or bed to the truck at that point. In the example shown, this means takes the form of an eye 33 screwed or bolted to brace member 17 of the truck frame. If desired, the hook and lever could be placed on the truck frame and the eye placed on the bed or platform. Lever 28 is placed in the position shown in Fig. 2, that is, thrown toward one side of the bed or platform when it is desired to engage the hook 31 in the eye 33.

In attaching the bed or platform to the truck frame, the bed or platform is placed on the frame and then pushed or thrust toward the toe end of the truck until the abutment brackets engage the truck axle. Hook 31 is then engaged or hooked in eye 33 and lever 28 is swung or moved until connecting link 30 just passes pivot point 29 of lever 28. A stop or abutment pin 34 attached to the bed or platform holds the lever in this position. It will be observed that swinging of lever 28 causes a movement of hook 31 away from eye 33 so that the bed or platform is pulled toward the axle end of the truck and abutment brackets 23 are held in firm engagement with axle 16. Thus it will be seen that the securing means at the handle end of the truck not only prevents accidental disengagement of the securing means at the axle end of the truck, but it also secures the handle end of the bed or platform to the truck frame. The securing means at the opposite ends of the truck act in opposite directions, that is, one prevents longitudinal movement of the bed or platform relative to the truck frame in one direction and the other prevents such movement in the opposite direction.

The underside of the bed or platform 19 is provided near one end with side lugs or brackets 35 which engage the inner sides of side pieces 11 when the bed or platform is mounted on the truck frame to prevent lateral movement of the bed or platform relative to the frame.

Fig. 5 shows a modification in the construction of the bed or platform 19. In this construction, the end members 20 are higher than those shown in Figs. 2, 3 and 4 and form frame members for a caged or screened in body comprising ends 36 and 37, top 38, side 39 and hinged side members 40, 41 and 42. As shown, the sides, ends, and top are made of screening secured to the frame members, but it is obvious that the walls of the body can be made solid and of any suitable material, such as wood or steel. Side members or doors 40 and 42 are each vertically pivoted to an end member 20, the swinging ends of these side members meeting when swung to closed position to close one side of the body. Suitable locking means are provided to lock side members 40 and 42 in closed position and thereby prevent unauthorized entry into the body. Side member or guard 41 is fitted in the side of the body normally closed by pivoted side members 40 and 42 to prevent packages piled or stacked up in the body from tumbling out when the doors are opened. Side member 41 is connected to end members 20 by detachable connections 43 and 44. By releasing connections 44, side member 41 may be swung on a horizontal axis with connections 43 as the pivot points, to make it possible to conveniently reach packages at the bottom of the body. Side member or package guard 41 need not extend the entire way from base to top, but, as shown in the drawing, extends only part of the way from the base to the top. A body such as described above is especially useful and desirable when trucking or transporting valuable merchandise or mail matter as the body can be loaded and locked and then later attached to a truck frame for transportation.

Figs. 6 and 7 show a modification in the means for attaching one end of the bed or platform 19 to the truck frame. As shown in Fig. 6, the toe 141 is provided with lugs 45 projecting toward the handle end of the truck. In the example illustrated, lugs 45 are integral with the toe and are formed by return bends of the metal composing the toe, but it is obvious that these lugs could be formed by casting, etc. Lugs 45 are so formed on toe 141 that when the toe is mounted on the truck frame, a space between the projecting lugs and the side pieces 11 corresponding to the approximate thickness of the bed or platform 19 is provided. The bed or platform is secured to the truck frame by pushing or thrusting one end of the bed or platform under the projecting lugs 45 causing the bed or platform to wedge under the projecting lugs of the toe. The handle end of the bed or platform is then secured to the truck frame as previously described. As shown in Fig. 7, one end of the bed or platform 19 is provided with recesses 46 adapted to receive the toe 141 to form a more secure engagement of the toe with the bed or platform.

Claims:

1. A combination truck comprising an open supporting framework provided at one end with an axle and supporting wheels and at the other end with grip handles and castors, a removable platform, said platform provided at one end with hook-shaped brackets engaging said axle, and means at the other end of said platform for attaching said end of the platform to the framework and for holding said brackets in engagement with said axle.

2. A combination truck comprising an open supporting framework provided at one end with an axle and supporting wheels and at the other end with grip handles and castors, a removable platform, said platform being provided at one end with hook-shaped brackets engaging said axle, means at the other end of said platform for connecting the platform to the framework, and means for tightening such connection.

3. A combination truck comprising an open supporting framework provided at one end with an axle and supporting wheels and at the other end with grip handles and castors, a removable platform, said platform being provided at one end with hook-shaped brackets engaging said axle, a lever carried by said platform, and a hook connected to said lever, said hook engaging means carried by the framework to connect the platform to the framework.

4. A combination truck comprising an open supporting framework provided at one end with an axle and supporting wheels and at the other end with grip handles and castors, a removable platform, said platform being provided at one end with hook-shaped brackets engaging said axle, means for preventing lateral movement of the platform relative to the framework, a lever carried by said platform, and a hook connected to said lever, said hook engaging an eye carried by the framework to connect the platform to the framework.

5. A combination truck comprising a supporting framework provided at one end with an axle and supporting wheels and at the other end with grip handles and castors, a removable enclosure or body member comprising a top, base, sides and ends, one of said sides provided with horizontally and vertically swinging doors, means for readily attaching one end of said body member to said framework by a thrust of said body member toward one end of said framework, and means for preventing accidental disengagement of such securing means and for securing the other end of said body member to said framework.

6. A combination truck comprising a supporting framework provided at one end with an axle and supporting wheels and at the other end with grip handles and castors, a removable platform, said platform provided with combined package supporting members and handle bars, said platform provided at one end with hook-shaped brackets engaging said axle to secure said end of the platform to the truck, and means for preventing disengagement of such securing means and for securing the other end of the platform to the framework.

In testimony whereof I hereunto affix my signature.

LOUIS E. WILSON.